(12) United States Patent
Ghanekar et al.

(10) Patent No.: US 10,831,623 B1
(45) Date of Patent: Nov. 10, 2020

(54) SYSTEMS AND METHODS FOR PERFORMING NODE FAILOVERS

(71) Applicant: Veritas Technologies LLC, Mountain View, CA (US)

(72) Inventors: Rajesh Ghanekar, Pune (IN); Tushar Shinde, Pune (IN); Mukund Agrawal, Pune (IN); Sreeharsha Sarabu, Pune (IN); Vaibhav Gupta, Cupertino, CA (US); Sandeep Jakka, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 258 days.

(21) Appl. No.: 15/472,268

(22) Filed: Mar. 29, 2017

(51) Int. Cl.
*G06F 11/00* (2006.01)
*G06F 11/20* (2006.01)
*G06F 11/16* (2006.01)
*G06F 16/182* (2019.01)

(52) U.S. Cl.
CPC ...... *G06F 11/2033* (2013.01); *G06F 11/1612* (2013.01); *G06F 16/183* (2019.01); *G06F 2201/85* (2013.01)

(58) Field of Classification Search
CPC .......................... G06F 11/2033; G06F 11/1612
See application file for complete search history.

(56) References Cited

U.S. PATENT DOCUMENTS

| | | | | |
|---|---|---|---|---|
| 6,920,454 | B1* | 7/2005 | Chan | G06F 9/5061 |
| 8,868,530 | B1* | 10/2014 | Thoppal | G06F 3/0622 707/704 |
| 2004/0068563 | A1* | 4/2004 | Ahuja | G06F 9/52 709/225 |
| 2009/0313445 | A1* | 12/2009 | Pandey | G06F 9/4856 711/162 |

OTHER PUBLICATIONS

Red Hat, "NFSv4 Server Restarts Causes Long Pause in NFS Client When Try to Open a File Under the Mount Point" (2016), Retrieved on Mar. 21, 2017 from https://access.redhat.com/solutions/42868.
Oracle, "Client Recovery in NFS Version 4" (2010), Retrieved on Mar. 21, 2017 from http://docs.oracle.com/cd/E19120-01/open.solaris/819-1634/rfsrefer-138/index.html.

* cited by examiner

*Primary Examiner* — Katherine Lin
(74) *Attorney, Agent, or Firm* — FisherBroyles, LLP (57) ABSTRACT

The disclosed computer-implemented method for performing node failovers may include: (1) initiating, during a failover of a first node to a second node, a grace period for the first node and the second node; (2) writing a new lock, indicating an internet protocol (IP) address, to a memory device of the second node, while maintaining: (A) an old lock of the IP address in a memory device of the first node, and (B) locks of nodes other than the first and second nodes; (3) transferring the old lock from the first node to the new lock of the second node, where requests to change the locks of nodes other than the first and second nodes are denied during transferring; and (4) stopping the grace period. Various other methods, systems, and computer-readable media are also disclosed.

22 Claims, 4 Drawing Sheets

SYSTEMS AND METHODS FOR PERFORMING NODE FAILOVERS

BACKGROUND

Reclaiming locks after a node failure or a user-initiated internet protocol (IP) failover may be costly in high-availability services since conventional IP failover techniques often require every node in the file system to enter a grace period during IP failover. During this grace period, which is typically required to allow clients to re-issue lock requests, a typical file range lock coordination mechanism may pause and resume service across all nodes in a file system, even other nodes in the file system that are not participating in the lock failover.

Accordingly, conventional lock recovery operations may prevent an entire file system (and thus all nodes) from servicing locking requests during this grace period, which can last up to two minutes or more. Conventional file systems may also lock file access during this grace period, which may cause client applications to pause during this time. Unfortunately, locking file access and pausing client applications in this manner may lead to violations of service providers' service-level agreements (SLAB).

The instant disclosure, therefore, identifies and addresses a need for improved systems and methods for performing node failovers.

SUMMARY

As will be described in greater detail below, the instant disclosure describes various systems and methods for performing node failovers. In one embodiment, a method for performing such a task may include (1) initiating, during a failover of a first node to a second node, a grace period for the first node and the second node; (2) writing a new lock, indicating an internet protocol (IP) address, to a memory device of the second node while maintaining: (A) an old lock of the IP address in a memory device of the first node as well as (B) locks of nodes other than the first and second nodes; (3) transferring the old lock from the first node to the new lock of the second node; and (4) stopping the grace period. In this embodiment, requests to change the locks of nodes other than the first and second nodes may be denied during the transferring step.

In other examples, the method may include limiting, during the grace period, an application pause to only an application using the first node and the second node. In some examples, the method may also include deleting unacquired locks following the transferring step but prior to stopping the grace period. In one embodiment, the first and second nodes may represent nodes in a network file system. In another embodiment, the first and second nodes may represent nodes in a cluster file system. In some examples, other than during the transferring step, the grace period does not affect nodes other than the first and second nodes. Additionally or alternatively, in other examples, load balancing across the first and second nodes may initiate the grace period.

In one example, a system for performing node failovers may include several modules stored in memory, including an initiating module that initiates, during a failover of a first node to a second node, a grace period for the first node and the second node. The system may also include a writing module that writes a new lock, indicating an internet protocol (IP) address, to a memory device of the second node while maintaining both an old lock of the IP address in a memory device of the first node and locks of nodes other than the first and second nodes. The system may also include a transferring module that transfers the old lock from the first node to the new lock of the second node. In this example, requests to change the locks of nodes other than the first and second nodes may be denied during a brief pause during transferring. Further, the system may include a stopping module that stops the grace period. The system may also include at least one physical processor that executes the initiating module, the writing module, the transferring module, and the stopping module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) initiate, during a failover of a first node to a second node, a grace period for the first node and the second node; (2) write a new lock, indicating an internet protocol (IP) address, to a memory device of the second node while maintaining: (A) an old lock of the IP address in a memory device of the first node and (B) locks of nodes other than the first and second nodes; (3) transfer the old lock from the first node to the new lock of the second node; and (4) stop the grace period. In some examples, requests to change the locks of nodes other than the first and second nodes may be denied during the transferring step.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for performing node failovers. As will be described in greater detail below, the disclosed systems and methods may write new locks to failover nodes while permitting unaffected nodes to change locks. After writing the new locks, these systems and methods may transfer old locks to new locks during a brief handover phase in which unaffected nodes (which do not partake in the failover lock transfer) cannot change locks. In this manner, the systems and methods described herein may enhance the availability of unaffected nodes to help service providers meet service-level agreement requirements. The systems and methods described herein also may limit application pausing and the inability to access files to only those applications running on affected nodes. By doing so, the systems and methods described herein may advantageously improve the availability of unaffected nodes, restrict lock reclaiming to only affected nodes, restrict application pauses to only two nodes during grace periods, and/or help service providers meet the demands of service-level agreements. In addition, these systems and methods may save power, time, processing-related expenses, or a combination thereof.

Figure 1:
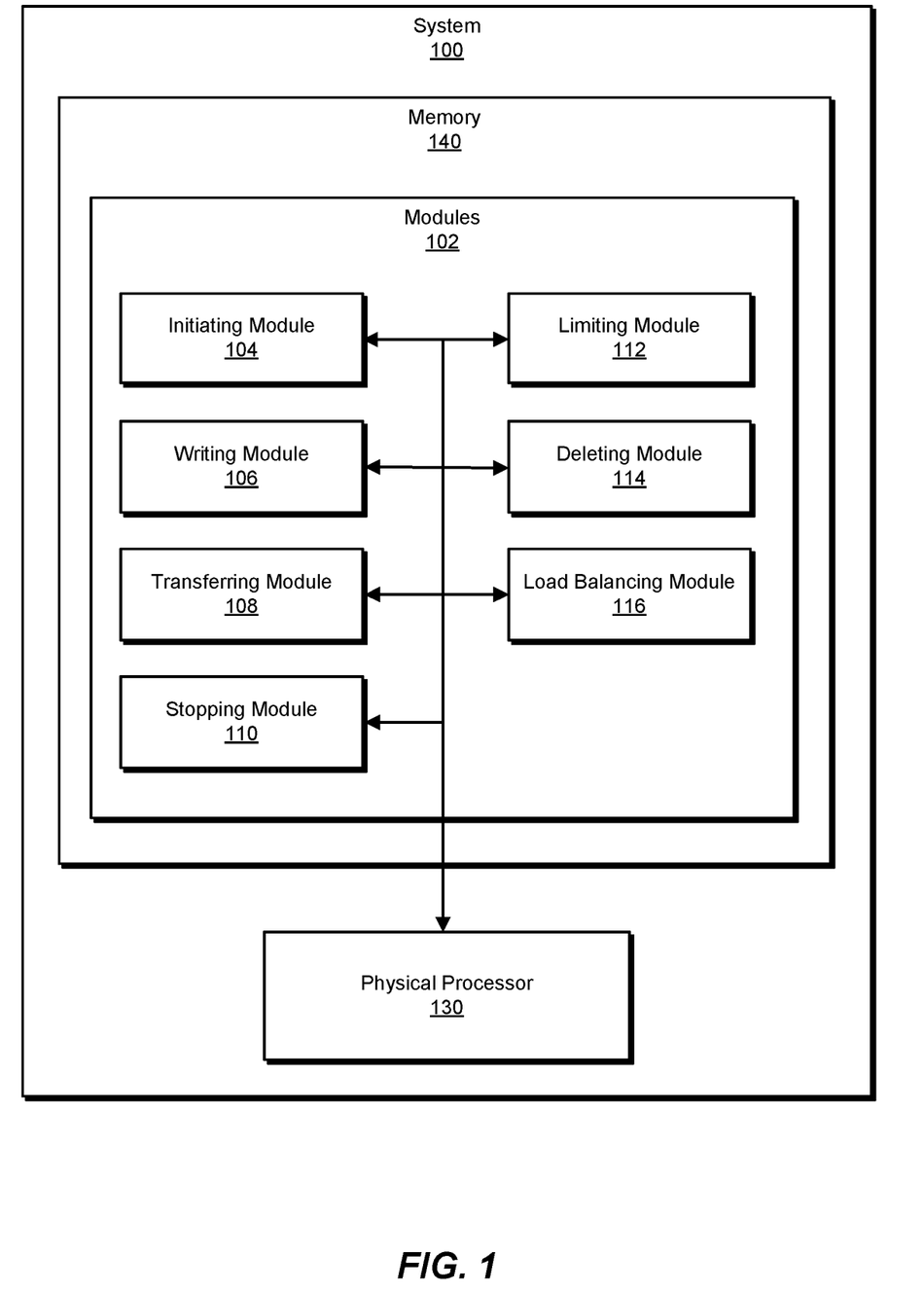
FIG. 1 is a block diagram of an example system for performing node failovers.
Figure 2:
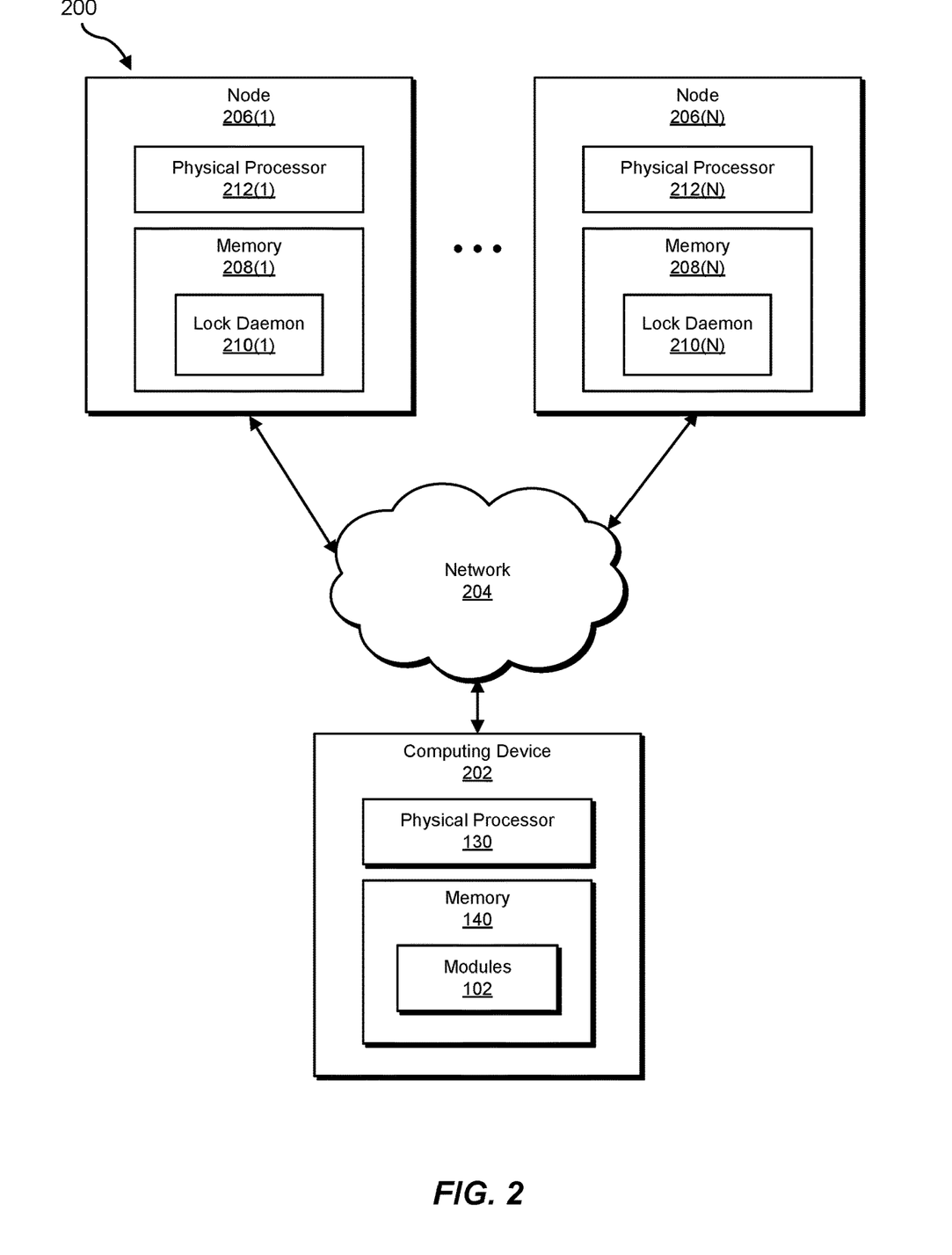
FIG. 2 is a block diagram of an additional example system for performing node failovers.

The following provides, with reference to FIGS. 1-2, detailed descriptions of example systems for performing node failovers. Detailed descriptions of corresponding computer-implemented methods are also provided in connection with FIGS. 3-4.

FIG. 1 is a block diagram of an example system 100 for performing node failovers. In some examples, example system 100 may represent a protocol server or the like. As illustrated in this figure, example system 100 may include one or more modules 102 for performing one or more tasks. As will be explained in greater detail below, modules 102 may include an initiating module 104, a writing module 106, a transferring module 108, a stopping module 110, a limiting module 112, a deleting module 114, and/or a load balancing module 116, and may execute all or a portion of a method 300 described below with respect to FIG. 3. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or nodes 206(1)-(N)). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate performing node failovers. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with one or more nodes 206(1)-(N) via a network 204. In one example, all or a portion of the functionality of modules 102 may be performed by computing device 202, nodes 206(1)-(N), and/or any other suitable computing system. As will be described in greater detail below, one or more of modules 102 from FIG. 1 may, when executed by at least one processor of computing device 202 and/or nodes 206(1)-(N), enable computing device 202 and/or nodes 206(1)-(N) to perform node failovers, handle client requests for locks, start grace periods, stop grace periods, the like, or combinations thereof.

Computing device 202 generally represents any type or form of computing device capable of reading computer-executable instructions. In some examples, computing device 202 may represent a system server, a protocol server, a network file system server, or the like. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, Internet-of-Things devices (e.g., smart appliances, etc.), gaming consoles, variations or combinations of one or more of the same, or any other suitable computing device.

Network 204 generally represents any medium or architecture capable of facilitating communication or data transfer. In one example, network 204 may facilitate communication between computing device 202 and nodes 206(1)-(N). In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Nodes 206(1)-(N) generally represent any type or form of computing device that is capable of being addressed as a node. Additional examples of nodes 206(1)-(N) include, without limitation, IP-addressable devices, file servers, network file servers, cluster file servers, storage servers, database servers, application servers, network file server version 3 servers, network file server version 4 servers, and/or web servers configured to run certain software applications and/or or provide various storage, database, and/or web services. Further examples of nodes 206(1)-(N) include, referring to FIG. 4, node 1, node 2, and node 3. Although illustrated as a single entity in FIG. 2, nodes 206(1)-(N) may include and/or represent a plurality of servers that work and/or operate in conjunction with one another.

As illustrated in FIG. 2, example system 200 may also include one or more memory devices, such as memory 208(1)-(N). Memory 208(1)-(N) generally represents any type or form of volatile or non-volatile storage device or medium capable of storing data and/or computer-readable instructions. In one example, memory 208(1)-(N) may store, load, and/or maintain one or more of lock daemon 210(1)-(N). Examples of memory 208(1)-(N) include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

The term "lock daemon," as used herein, generally represents any type or form of administrative program capable of managing connections between a node (e.g., nodes 206(1)-(N)) and other computing devices (e.g., computing device 202), such as via a network (e.g., network 204). In one example, the connections between clients and nodes 206(1)-(N) may be IP-based connections. In some embodiments, lock daemon 210(1)-(N) may process lock requests from computing device 202, a client device such as those depicted in FIG. 4, other nodes, the like, or a combination thereof. In these embodiments, locking may provide exclusive access by a client to a file, connection, or process on nodes 206(1)-(N). Locking may also prevent other clients from accessing the locked file, connection, or process until releasing the lock. In some examples, lock daemon 210(1)-(N) may receive instructions from a computing device (e.g., computing device 202), such as instructions to perform at least a part of example computer-implemented method 300, and execute the requested instructions.

As illustrated in FIG. 2, example system 200 may also include one or more physical processors, such as physical processor 212(1)-(N). Physical processor 212(1)-(N) generally represents any type or form of hardware-implemented processing unit capable of interpreting and/or executing computer-readable instructions. In one example, physical processor 212(1)-(N) may access and/or modify lock daemon 210(1)-(N) stored in memory 208(1)-(N). Additionally or alternatively, physical processor 212(1)-(N) may execute lock daemon 210(1)-(N) to facilitate performing node failovers. Examples of physical processor 212(1)-(N) include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Many other devices or subsystems, such as clients or other nodes, may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
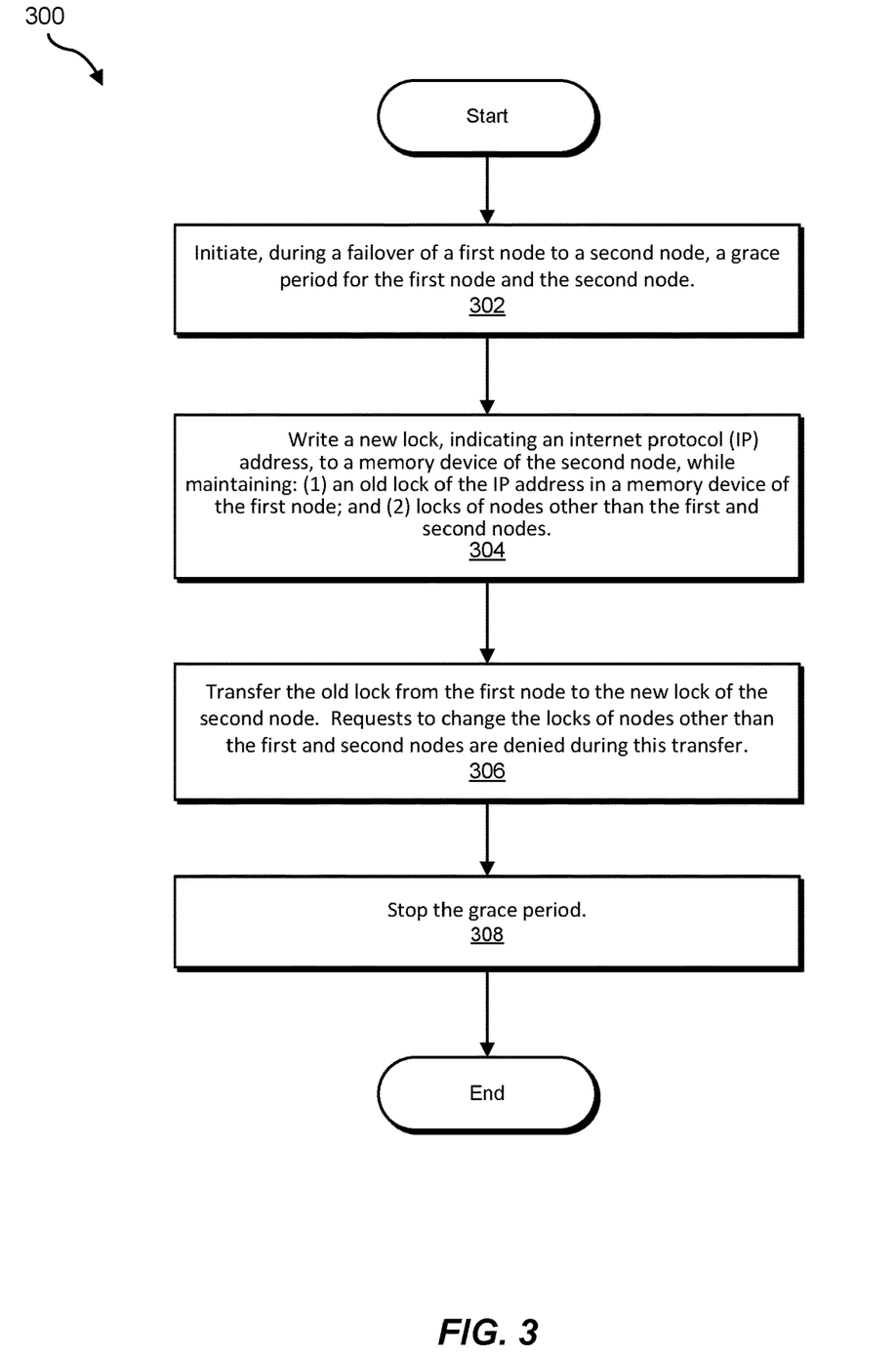
FIG. 3 is a flow diagram of an example method for performing node failovers.

FIG. 3 is a flow diagram of an example computer-implemented method 300 for performing node failovers, such as between first and second nodes. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of systems described herein, such as initiating module 104 in system 100 in FIG. 1 or computing device 202 in FIG. 2, may initiate, during a failover of a first node to a second node, a grace period for the first node and the second node. In some examples, the first and second nodes may represent nodes in network file systems. In other examples, the first and second nodes may represent nodes in cluster file systems.

During a failover event, the grace period may provide clients having locks prior to the failure with an opportunity to reclaim locks. During the grace period, the disclosed systems (e.g., limiting module 112) may decline to issue new locks for the first node or the second node in response to new lock requests for the same. In other words, during this grace period the systems may only issue new locks in response to new lock requests for locks other than on the first node or the second node. By doing so, the disclosed systems (e.g., limiting module 112) may limit, during the grace period, application pauses and the inability to access files to only those applications that are using the first node and the second node. Limiting application pauses and the inability to access files in this manner may both increase the availability of applications running on nodes other than the first node and the second node and help service providers meet obligations under SLAs with clients. Moreover, in some examples, other than during the transferring step described in connection with step 306 below, this grace period may only affect the first and second nodes. By doing so, the disclosed systems may increase node availability and help service providers meet SLA obligations.

Figure 4:
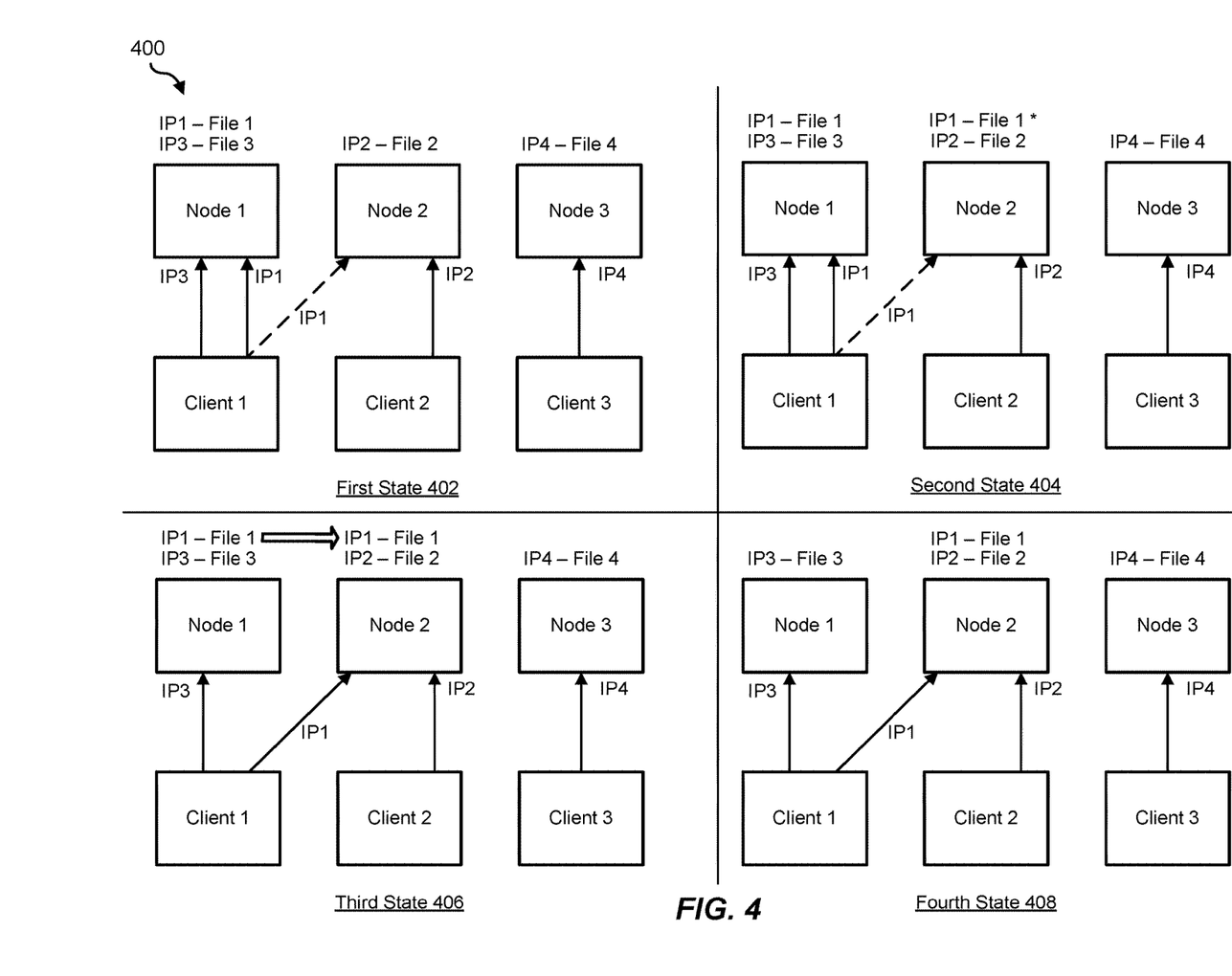
FIG. 4 is an example of state flows in failovers.

The systems described herein may perform step 302 in a variety of ways. FIG. 4 is an example of state flow in a failover 400. Each of the states of FIG. 4—first state 402, second state 404, third state 406, and fourth state 408—will be described, in turn, with reference to steps of example computer-implemented method 300.

Referring to FIG. 4, first state 402 depicts a state in which the "old" or preexisting locks include:
"client 1 accesses file 1 at node 1 via IP1,"
"client 1 accesses file 3 at node 1 via IP3,"
"client 2 accesses file 2 at node 2 via IP2," and
"client 3 accesses file 4 at node 3 via IP4."

In first state 402, IP1 fails, IP1's failover to node 2 starts, and the system initiates a grace period for node 1 and node 2. In some examples, there may be more nodes, in addition to node 3, which are treated similarly to node 3.

In some examples, initiating load balancing (e.g., by load balancing module 116) across first and second nodes may trigger example computer-implemented method 300. Load balancing may efficiently distribute network traffic over several nodes and reduce concentrated loading on a single node to increase node availability and reduce latency for concurrent client access.

The term "lock," as used herein, generally refers to any form of providing exclusive access by a client to a file, connection, or process on a node. Locking may also prevent other clients from accessing the locked file, connection, or process until releasing the lock.

The term "failover," as used herein, generally refers to any form of transfer of locked access from one node to another node (i.e., "affected nodes") resulting from access failure. In examples, failover may occur from a primary node to a backup node, failover may occur from a first node having a specific file to a second node having a copy of the specific file, and the like.

The term "grace period," as used herein, generally refers to any time period, following initiating failover, during which new lock requests are not serviced by at least one node, to enable lock recovery as a part of failover operations.

Returning to FIG. 3, at step 304, one or more of systems described herein, such as writing module 106 on system 100 in FIG. 1 or computing device 202 in FIG. 2, may write a new lock, indicating an IP address, to a memory device of the second node. While writing new locks, the disclosed systems may maintain an old lock of the IP address in a memory device of the first node. As such, the second node may not try to acquire the new locks as the lock is still in an acquired state on the first node. While writing new locks, the disclosed systems may also maintain locks of nodes other than the first and second nodes. By maintaining the locks of nodes other than the first and second nodes, the disclosed systems may increase the availability of other nodes and may help a service provider meet obligations under a service-level agreement with a client.

The systems described herein may perform step 304 in a variety of ways. Referring to FIG. 4, second state 404 depicts a state in which old locks are still in place and a new lock is written. Second state 404 includes the following locks:

"client 1 accesses file 1 at node 1 via IP1,"
"client 1 accesses file 3 at node 1 via IP3,"
"client 2 accesses file 2 at node 2 via IP2," and
"client 3 accesses file 4 at node 3 via IP4."

In second state 404, the system writes a new lock of "client 1 accesses file 1 at node 2 via IP1" to memory in node 2. In FIG. 4, the new lock is depicted with an asterisk. The grace period is in effect in second state 404, and the system maintains an old lock of IP1 in a memory device of the node 1. While writing new locks, the system also maintains locks of node 3, which is a node other than node 1 and node 2.

Returning to FIG. 3, at step 306, one or more of systems described herein, such as transferring module 108 on system 100 in FIG. 1 or computing device 202 in FIG. 2, may transfer the old lock from the first node to the new lock of the second node. In some examples, requests to change the locks of nodes other than the first and second nodes may be denied during this transfer operation.

The systems described herein may perform step 306 in a variety of ways. Referring to FIG. 4, third state 406 depicts a handover phase in which old locks are handed over to the new locks in the following manner:

"client 1 accesses file 1 at node 1 via IP1" is handed over to: "client 1 accesses file 1 at node 2 via IP1,"
"client 1 accesses file 3 at node 1 via IP3,"
"client 2 accesses file 2 at node 2 via IP2,"
"client 3 accesses file 4 at node 3 via IP4."

In third state 406, the system briefly blocks lock acquisition at nodes other than node 1 and node 2 to prevent acquiring the same lock on the same file at another node. The system then transfers the old lock from node 1 to the new lock of node 2 by node 2's lock daemon requesting release of the old lock and activating the new lock. In some examples, the handover phase takes 5 seconds or less. Following transfer, the system releases the old lock of "client 1 accesses file 1 at node 1 via IP1." In some examples, third state 406 may take place toward the end of the grace period.

In further examples, the disclosed systems (e.g., deleting module 114) may delete unacquired locks following performing the transferring step but prior to stopping the grace period. By deleting unacquired locks that are no longer requested by the clients, the system makes these locks available to other clients and applications after the grace period is over. Alternatively or in addition, the systems and methods herein may detect anomalies in lock transfer and initiate a stoppage of lock transfer and acquisition on all-nodes in order to address the anomaly.

Returning to FIG. 3, at step 308, one or more of systems described herein, such as stopping module 110 in system 100 in FIG. 1 or computing device 202 in FIG. 2, may stop the grace period.

The systems described herein may perform step 308 in a variety of ways. For example, and with reference to FIG. 4, the grace period ends, the brief pause has ended, and fourth state 408 depicts the locks after the grace period ends. Fourth state 408 depicts locks as:

"client 1 accesses file 1 at node 2 via IP1,"
"client 1 accesses file 3 at node 1 via IP3,"
"client 2 accesses file 2 at node 2 via IP2," and
"client 3 accesses file 4 at node 3 via IP4."

In fourth state 408, all nodes resume providing locks as needed.

As explained above, the disclosed systems and methods may write new locks to failover nodes while permitting unaffected nodes to change locks. Since unaffected nodes can change locks except during a brief pause while locks transfer between affected nodes, the systems described herein may enhance the availability of unaffected nodes to help service providers meet SLA requirements. The systems described herein also may limit application pausing to only those applications running on the affected nodes, thereby advantageously improving the availability of unaffected nodes.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures may be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for performing node failovers, at least a portion of the method being performed by a computing device comprising at least one processor, the method comprising:
    initiating, during a failover of a first node to a second node, a grace period for the first node and the second node, wherein no new locks are issued for the first node during the grace period and the failover results from a network access failure of a locked Internet Protocol (IP) connection;
    writing a new lock, indicating an IP address, to a memory device of the second node, while:
        maintaining an old lock of the IP address in a memory device of the first node; and
        issuing, during the grace period and in response to a new lock request, a new lock for a node other than the first and second nodes;
    transferring the old lock from the first node to the new lock of the second node, wherein requests to change the locks of nodes other than the first and second nodes are denied during transferring; and
    stopping the grace period.

2. The computer-implemented method of claim 1, further comprising limiting, during the grace period, an application pause to only an application using the first node and the second node.

3. The computer-implemented method of claim 1, further comprising deleting unacquired locks following transferring and prior to stopping the grace period.

4. The computer-implemented method of claim 1, wherein the first and second nodes are in a network file system.

5. The computer-implemented method of claim 1, wherein the first and second nodes are in a cluster file system.

6. The computer-implemented method of claim 1, wherein other than during transferring, the grace period does not affect nodes other than the first and second nodes.

7. The computer-implemented method of claim 1, further comprising load balancing across the first and second nodes to initiate the grace period.

8. A system for performing node failovers, the system comprising:
- an initiating module, stored in memory, that initiates, during a failover of a first node to a second node, a grace period for the first node and the second node, wherein no new locks are issued for the first node during the grace period and the failover results from a network access failure of a locked Internet Protocol (IP) connection;
- a writing module, stored in memory, that writes a new lock, indicating an IP address, to a memory device of the second node, while:
  - maintaining an old lock of the IP address in a memory device of the first node; and
  - issuing, during the grace period and in response to a new lock request, a new lock for a node other than the first and second nodes;
- a transferring module, stored in memory, that transfers the old lock from the first node to the new lock of the second node, wherein requests to change the locks of nodes other than the first and second nodes are denied during transferring;
- a stopping module, stored in memory, that stops the grace period; and
- at least one physical processor that executes the initiating module, the writing module, the transferring module, and the stopping module.

9. The system of claim 8, further comprising a limiting module, stored in the memory, that limits, during the grace period, an application pause to only an application using the first node and the second node.

10. The system of claim 8, further comprising a deleting module, stored in memory, that deletes unacquired locks following transferring and prior to stopping the grace period.

11. The system of claim 8, wherein the first and second nodes are in a network file system.

12. The system of claim 8, wherein the first and second nodes are in a cluster file system.

13. The system of claim 8, wherein other than during transferring, the system does not affect nodes other than the first and second nodes during the grace period.

14. The system of claim 8, further comprising a load balancing module, stored in memory, that load balances across the first and second nodes to initiate the grace period.

15. A non-transitory computer-readable medium comprising one or more computer-executable instructions that, when executed by at least one processor of a computing device, cause the computing device to:
- initiate, during a failover of a first node to a second node, a grace period for the first node and the second node, wherein no new locks are issued for the first node during the grace period and the failover results from a network access failure of a locked Internet Protocol (IP) connection;
- write a new lock, indicating an IP address, to a memory device of the second node, while:
  - maintaining an old lock of the IP address in a memory device of the first node; and
  - issuing, during the grace period and in response to a new lock request, a new lock for a node other than the first and second nodes;
- transfer the old lock from the first node to the new lock of the second node, wherein requests to change the locks of nodes other than the first and second nodes are denied during transferring; and
- stop the grace period.

16. The non-transitory computer-readable medium of claim 15, wherein the computer-executable instructions comprise computer-executable instructions that cause the computing device to limit, during the grace period, an application pause to only an application using the first node and the second node.

17. The non-transitory computer-readable medium of claim 15, wherein the computer-executable instructions comprise computer-executable instructions that cause the computing device to delete unacquired locks following transferring and prior to stopping the grace period.

18. The non-transitory computer-readable medium of claim 15, wherein the first and second nodes are in a network file system.

19. The non-transitory computer-readable medium of claim 15, wherein the first and second nodes are in a cluster file system.

20. The non-transitory computer-readable medium of claim 15, wherein the computer-executable instructions comprise computer-executable instructions that cause the computing device to, other than during transferring, not affect nodes other than the first and second nodes during the grace period.

21. The computer-implemented method of claim 1, wherein the memory device of the first node is a constituent part of only the first node.

22. The computer-implemented method of claim 1, further comprising:
- receiving, during the grace period and from a client, a new lock request for the second node; and
- declining to issue the new lock for the second node.

* * * * *